US012563382B2

(12) United States Patent
Radier et al.

(10) Patent No.: US 12,563,382 B2
(45) Date of Patent: Feb. 24, 2026

(54) MANAGING COMMUNICATION TERMINAL PROFILES

(71) Applicant: Orange, Issy-les-Moulineaux (FR)

(72) Inventors: Benoît Radier, Chatillon (FR); Olivier Le Grand, Chatillon (FR); Gaël Fromentoux, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 322 days.

(21) Appl. No.: 18/555,231

(22) PCT Filed: Apr. 7, 2022

(86) PCT No.: PCT/FR2022/050644
§ 371 (c)(1),
(2) Date: Oct. 12, 2023

(87) PCT Pub. No.: WO2022/219265
PCT Pub. Date: Oct. 20, 2022

(65) Prior Publication Data
US 2024/0196196 A1 Jun. 13, 2024

(30) Foreign Application Priority Data
Apr. 13, 2021 (FR) ...................................... 2103782

(51) Int. Cl.
*H04W 8/20* (2009.01)
*H04W 12/06* (2021.01)

(52) U.S. Cl.
CPC ........... *H04W 8/205* (2013.01); *H04W 12/06* (2013.01)

(58) Field of Classification Search
CPC ........ H04L 41/28; H04L 41/40; H04W 12/06; H04W 12/35; H04W 12/40; H04W 24/08; H04W 8/18; H04W 8/205; H04W 8/30
See application file for complete search history.

(56) References Cited

U.S. PATENT DOCUMENTS

2020/0021975 A1 1/2020 Schouler
2022/0330112 A1* 10/2022 Kumar Patra ........ H04W 12/06

FOREIGN PATENT DOCUMENTS

FR 3 056 781 A1 3/2018

OTHER PUBLICATIONS

V Gsma et al., "GSM Association Non-confidential Official Document SGP. 22-SGP. 22 RSP Technical Specification Security Classification: Non-confidential GSM Association Non-confidential Official Document SGP.22-SGP.22 RSP Technical Specification", Jun. 5, 2020, p. 41.

(Continued)

*Primary Examiner* — Timothy X Pham
(74) *Attorney, Agent, or Firm* — Knobbe, Martens, Olson & Bear, LLP

(57) ABSTRACT

A method for managing service profiles, implemented by a management server of a provider of a plurality of services, the profiles being allocatable to communication terminals accessing a communications network supporting the service, the method including: a) reception of a first message to update the management server, originating from an access manager, comprising at least one update of a first total number of service profiles active on the communications network, b) reception of a second message to update the management server, originating from an authentication server and comprising at least one update of a second total number of service profiles active on the communications network, and c) management of access to the service via at least one comparison between the first total number of service profiles active on the communications network and the second total number of service profiles active on the communications network.

12 Claims, 2 Drawing Sheets

(56)　　　　　　　References Cited

OTHER PUBLICATIONS

Sections 3.1.1 and 3.1.4 of the RSP Technical Specification document, Version 2.0, Oct. 14, 2016.
French Search Report and Written Opinion for French Patent Application No. FR2103782 dated Dec. 16, 2021.
International Search Report for International Application No. PCT/FR2022/050644, dated Aug. 5, 2022.

* cited by examiner

MANAGING COMMUNICATION TERMINAL PROFILES

CROSS-REFERENCE TO RELATED APPLICATIONS

This application is filed under 35 U.S.C. § 371 as the U.S. National phase of application No. PCT/FR2022/050644 entitled "MANAGING COMMUNICATION TERMINAL PROFILES" and filed Apr. 7, 2022, and which claims priority to FR 2103782 filed Apr. 13, 2021, each of which is incorporated by reference in its entirety.

BACKGROUND

Technical Field

This disclosure relates to the field of managing telecommunications network operations, and more particularly to managing network operations using software functions governed by associated operating licenses.

Prior Art

The security of communications networks of industrial client companies often requires the deployment of non-public networks (known as NPNs) by service providers. In order to offer the customer a complete and modular range of services within the deployed network, service providers integrate virtual software functions into the network architecture, these functions having operating conditions for the deployed services that are specified by right-to-use licenses associated with these software functions. These operating conditions for services can, for example, concern the maximum number of simultaneous connections to a service as supported by the deployed network.

Utilization of the deployed network involves in particular the connection, to the network, of the various terminals which make up the customer's fleet of equipment. This connection may in particular be a subscription by the customer via an offering which allows the customer to benefit from a single contract while authorizing the various terminals of the customer's fleet of equipment to be associated with this contract. Such an offering then entails the service provider providing several service profiles for a same contract, each profile being downloadable onto an electronic security processor (called an Embedded Subscriber Identity Module, embedded SIM, or eSIM) which most often is integral with a terminal. Several customer terminals can thus be active and connected simultaneously to the deployed network.

However, when the customer is managing the associations between the subscribed service profiles and the terminals accessing the network (in particular when adding or deleting an association between a given profile and terminal), this customer lacks visibility into the correct correspondence between profiles and associated active terminals within the information system of the deployed network. As a result, management of operations within the deployed network comprises potential correspondence issues that go unnoticed by the customer (such as the presence of "ghost" profiles which are connected to the network without authorization from the customer).

In addition, the customer also lacks visibility into the operation of the deployed network with regard to the conditions of use for the software functions used to construct the deployed network, as specified by the operating licenses, which potentially leads to overutilization or, conversely, underutilization of the actual capacities of the deployed network.

SUMMARY

This disclosure improves the situation.

A method is proposed, implemented by a management server of a provider of a plurality of services, for managing service profiles relating to a service among the plurality, the profiles being allocatable to communication terminals accessing a communications network supporting said service, the method comprising:

a) reception of a first message to update the management server, originating from an access manager, said first message comprising at least one update of a first total number of service profiles active on the communications network, b) reception of a second message to update the management server, originating from an authentication server, said second message comprising at least one update of a second total number of service profiles active on the communications network, c) management of access to the service via at least one comparison between the first total number of service profiles active on the communications network and the second total number of service profiles active on the communications network.

As a result, the method allows both a customer utilizing services of a communications network and the provider of the network services to manage access to and use of the network services. Indeed, such access and use management consist in particular of regularly ensuring that the number of service profiles registered by the provider and authorized to be activated on the network is identical to the number of service profiles actually active and used on the network by the customer. This allows detecting any active profiles on the network that are not authorized by the customer (such profiles referred to as "ghost profiles") or possible mismatch issues between the information systems of the customer and the provider.

The proposed method thus consists of updating a management server which makes it possible to ensure visibility in the access and use of the network, in particular in the context of managing service profiles subscribed to for a customer's fleet of terminal devices. The management server therefore makes it possible to centralize information about the use of network services by the customer on the one hand, via the update carried out by the access manager, and on the other hand authentication information registered by the provider, via the update carried out by the authentication server. Such centralization of information by the management server offers overall visibility into the level of use of network services by the customer, and allows both the customer and the provider to verify consistency in the utilization of network services.

The access manager may correspond to a platform for managing service profiles activated on communication terminals, and more particularly on security modules such as "eSIM" (or "embedded Subscriber Identity Module") cards which enable a communication terminal to download service profiles within a context of a virtualized connectivity offering. The access manager is then capable, at the request of the service provider, of creating service profiles downloadable to eSIM cards of communication terminals. The access manager can in particular communicate directly with a customer's communication terminal, for example when the terminal wants to activate its profile created by the access manager. The access manager can in particular list the service profiles that it has created and actually activated on eSIM cards of communication terminals. Thus, the first message to update the management server, originating from the access manager, can contain information relating to the service profiles actually activated and makes it possible to reflect an actual state of use of the network services by the customer.

The authentication server is mainly linked to an authentication database which allows storing the service profiles subscribed to by the customer, their activation state, and other information, in particular information relating to the various communication terminals using the stored profiles. The authentication database of the authentication server thus contains all the information relating to the service profiles as registered by the provider. The second message to update the management server, originating from an authentication server, can contain information relating to the service profiles registered by the provider under an "active" type of activation status, and makes it possible to reflect the profiles authorized by the provider to access the network.

Service profile updates registered by the authentication server on the one hand, and by the access manager on the other hand, are initially made without mutual verification of consistency between the authentication server and the access manager, so the information registered by the authentication server may differ from the information registered by the access manager. Management of access to network services by the management server then makes it possible in particular to verify such consistency in the registered information.

Such a method may be implemented periodically, for example as part of an audit of the service provider's information system, so that each customer has visibility at regular intervals into the access management for provider services.

According to one embodiment, the method is implemented after acceptance of a request from a current terminal to modify the allocation of a current profile among the subscribed service profiles.

As a result, such a method of access management by updating the management server can also be initiated following an allocation modification request for a current profile, received and validated by the provider's information system, such that each new update received and registered by the service provider can trigger an update of the management server according to the described method.

An allocation modification request for a current profile can be initiated by a current terminal among the customer's communication terminals and can concern a current profile among the service profiles subscribed to by the customer. A current profile is defined as a service profile that is the subject of the request and is allocated to the customer within the context of a connectivity offering subscribed to by the customer with the service provider, for example. Such a current profile may have been activated by the customer (for example during a previous request) or may be inactive (if the customer has not yet activated the current profile for example). A current terminal is defined as a communication terminal that is part of the customer's fleet of equipment, the equipment being able to be attached to the communications network so as to use the services provided by the provider within the context of a connectivity offering subscribed to by the customer. The communication terminal concerned by the request is called the "current terminal". At the time the request is initiated, such a current terminal may already be attached to the deployed network by an active service profile (which may or may not be the current profile) or may not be connected to the network (for example if the current terminal does not yet have an associated active service profile).

A request by the current terminal to modify the current profile allocation can then consist of requesting activation of the current profile on the current terminal in order to attach this current terminal to the network and thus register the addition of the current profile to all service profiles activated on the network. The request by the current terminal to modify the current profile allocation can also consist of requesting the disassociation of the current profile from the current terminal which were initially linked, and thus registering a deletion of the current profile from all service profiles activated on the network. The request can be processed according to existing procedures for installing and uninstalling service profiles, so as to result in an acceptance or non-acceptance of the request which leads to modifying the access of service profiles subscribed to in the network.

The method of updating the management server and managing access to network services thus can be triggered when the service provider receives, via a human-machine interface for example, a request from a current terminal requesting the modification of a current profile allocation by a current terminal and this request is validated by the provider, for example after executing existing verification procedures which allow confirming the request. The steps of the proposed method are then initiated, for example, when the service provider determines that the current profile can be associated with the current terminal (in the context of an add request) or that the current profile can be deleted from the current terminal (in the context of a deletion request), and the provider triggers the registration of the modification accordingly.

In the context of the development, the management server can in particular receive a notification, an activation, or any other signal emitted for example by the access manager, by the authentication server, or more generally by the service provider, in order to signal the acceptance of a new allocation modification request by the provider and a new imminent update of the management server, which triggers the proposed method.

According to another aspect, a management server of a provider of a plurality of services is proposed, said management server comprising at least:
   a memory unit,
   a processor, said management server being adapted to implement the method as described.

According to another aspect, a computer program is proposed comprising instructions for implementing the method as described when this program is executed by a processor.

The features set forth in the following paragraphs may optionally be implemented independently of each other or in combination with each other:

According to one embodiment, the management server further comprises at least one value relating to a maximum number of service profiles that can be activated simultaneously on the communications network.

As a result, access management for the network services makes it possible to verify that the utilization of network services is in compliance with the network operating conditions, these conditions being defined in right-to-use licenses when the network is constructed. Indeed, software functions can be used by the provider for constructing the network and the terms of use of these functions are negotiated by the provider with sellers of software functions, in right-to-use licenses. One usage right may for example concern a maximum number of users simultaneously connected to the network. When utilizing network services and in particular when managing subscribed service profiles, the customer generally lacks visibility into the network access limits imposed by such licenses and have difficulty guaranteeing consistency between management of its subscription and the network capacities as described by the usage rights.

Thus, by comprising a value relating to a maximum number of service profiles that can be activated simultaneously on the communications network, the management server makes it possible in particular to compare the number of service profiles active on the network as registered by the authentication server, the total number of service profiles active on the network as registered by the access manager, and the maximum number of service profiles that can be activated simultaneously on the network, so as to verify network use by the customer relative to the operating conditions of this network. The described method of access management can then consist of carrying out several comparisons: on the one hand, one or more comparisons of consistency in the information registered by the authentication server and by the access manager, and on the other hand, comparison of this information (for example, whether this information is consistent) with the conditions of use for the network services.

The management server thus allows information centralization, which offers visibility to the customer (for example by direct read access to the management server at any time) on their level of use of the services to which they have subscribed. This information centralization at the management server potentially allows the provider to identify a need to update the customer's subscription offering so that the capacities of the network as subscribed to by the customer (for example, in terms of maximum number of profiles supported simultaneously by the network) is consistent with the customer's actual use of the network (for example, in terms of the number of profiles actually active simultaneously on the network).

It is also possible that the management server comprises several values relating to several different maximum numbers of service profiles that can be activated simultaneously on the communications network. This is the case in particular when several software functions are used by the provider in the construction of the network, and each software function corresponds to a separate operating license.

According to one embodiment, the management server is readable by at least one customer of the service provider, via a human-machine interface.

Consequently, the method provides real-time visibility of the customer's use of network services and allows access management for the network services that is visible to the customer. Reading the management server in the context of the method allows the customer to detect a possible mismatch issue between the information systems of the provider and the customer, and to detect any usage anomaly such as the presence of active profiles on the network without customer authorization or that were thought to have been removed from the network by the customer.

Furthermore, reading the management server allows the customer to verify, in the context of managing subscribed service profiles and the general utilization of network services, that the network capacities are not exceeded according to the conditions of use subscribed to by the customer, and more generally that the network is utilized by the customer as close to the limits as possible in terms of capacities and sizing. Reading the management server, which centralizes all the information and in particular the information concerning network usage rights, potentially allows the customer to identify a possible need to adapt the sizing of the network to the actual use made of it by the customer, for example by changing the offering subscribed to by the customer with the provider.

According to one embodiment, the maximum number of service profiles that can be activated simultaneously on the communications network is predefined by at least one operating license of the communications network.

As a result, the method allows establishing a relation, via the management server, between information about the customer's utilization of the network and the content of the network operating licenses defining the usage rights relating to the network, these usage rights conventionally being poorly understood by the customer and poorly correlated with the customer's actual use of the network. Indeed, during construction of the communications network, the service provider (corresponding for example to a cellular network operator) buys a set of software functions from software function vendors and integrates them into the network architecture according to the conditions of use (or usage rights) specifically negotiated between the software function vendors and the provider. These conditions of use are detailed in network operating licenses and can concern various aspects of the use of the network by the provider's customer. Among other things, a network usage right can concern a maximum number of service profiles that can be activated simultaneously on the communications network. Thus, when the customer subscribes to a communications offering from the provider, the customer subscribes to as many operating licenses as there are potential network users (this number of users typically corresponding to the number of communication terminals that the customer wishes to connect to the network). However, during the actual operation of the network, the customer and the provider generally lack visibility into the consistency between network use and the subscribed operating licenses.

Thus, the method allows both the customer and the provider to ensure that the operating licenses as subscribed to by the provider for the construction of the network are complied with by the customer. In particular, profile access management via the management server can allow verifying that the maximum number of service profiles that can be activated simultaneously on the communications network is not exceeded, in particular at each modification to the allocation of a service profile by the customer (in particular each time an activated profile is added to the network). This access management then potentially enables the customer and/or the provider to adapt the offering subscribed to by the customer so that the network capacities best correspond to the customer's usage requirements.

According to one embodiment, the first message further comprises at least one updating of an association between:
  an identifier of a current profile among the allocatable service profiles,
  an identifier of a current terminal among the communication terminals accessing the network, and
  an identifier of the communications network.

According to one embodiment, the second message further comprises an updating of an association between:
  an identifier of a current profile among the allocatable service profiles,
  an identifier of a current terminal among the communication terminals accessing the network, and
  an identifier of the communications network.

As a result, the access management for the network makes it possible not only to verify the consistency in the number of active service profiles on the network but also the various associations between each active service profile and each terminal attached to the communications network. In particular, this allows the customer and the provider to ensure that the activated profiles among all the service profiles subscribed to by the customer are indeed the profiles actually requested and used by the customer (and therefore to identify a possible problem in processing a request to add a service profile by the provider by activating one profile in place of another for example) and that each activated profile is indeed associated with a communication terminal designated by the customer.

According to one embodiment, at the end of step c), the management server comprises data indicating an anomaly if the first total number of service profiles active on the communications network and the second total number of service profiles active on the communications network are not equal.

As a result, the method makes it possible to notify the customer (which the customer can for example read directly via a screen of a communication terminal), via the management server, that the network access and use have an irregularity due to the fact that the number of profiles registered by the provider via the authentication server is different from the number of profiles actually used by the customer and registered by the access manager. This then allows the customer to correct the network access (for example by requesting deletion of a profile activated in error by the provider and not used by the customer) in order to re-update the management server and once again ensure that there is consistency in the information contained in the control log.

Furthermore, the method can also allow the provider to be warned, via the management server, of an irregularity in network utilization due to the fact that the number of profiles identified by the provider via the authentication server is different from the number of profiles actually used by the customer and registered by the access manager. The provider can then contact the customer, or for example temporarily suspend any new request from the customer for adding service profiles until the irregular situation is rectified (for example, until the customer requests deletion of a profile activated in error by the provider and not used by the customer).

According to one embodiment, access management for the service further comprises a comparison of the first total number and/or the second total number of service profiles active on the communications network, to at least the maximum number of service profiles that can be activated simultaneously on the communications network.

As a result, the access management for network services as proposed makes it possible to verify that the customer's use of the network operating licenses is indeed in compliance. The method does make it possible to check regularly that the network capacities in terms of maximum number of users connected to the network are not exceeded.

Management of the network may further comprise several comparisons between the first total number and/or the second total number of service profiles active on the communications network, and several maximum numbers of users connected to the network corresponding to different operating licenses.

According to one embodiment, the operating license is updated if, following the comparison of the first total number and/or the second total number of service profiles active on the communications network, to the maximum number of service profiles that can be activated simultaneously on the communications network, the first total number and/or the second total number of service profiles active on the communications network does not correspond to the maximum number of service profiles that can be activated simultaneously on the communications network, said updating of the operating license consisting of modifying the maximum number of service profiles that can be activated simultaneously on the communications network.

As a result, the method makes it possible, at a minimum, to identify a need to adapt the connectivity offering subscribed to by the customer with the provider in an "intelligent" way, according to the customer's actual level of utilization of the network capacities. Updating the operating license can consist of increasing the number of licenses associated with the offering subscribed to by the customer, so as to increase the maximum number of service profiles that can be activated simultaneously on the communications network if the access management for the network services reflects overutilization of the network, i.e. the customer simultaneously activates a greater number of service profiles than the maximum number of service profiles that can be activated simultaneously on the communications network. In this case, the management server can trigger a request to update the customer's connectivity offering, for example by executing a smart contract type of update to the subscription contract. The updating of the network operating licenses is carried out by the vendors of the software functions concerned, for example by performing a network software update. The proposed method thus allows the service provider as well as the customer to manage access to network services by the customer and to best adapt the connectivity offering subscribed to by the customer to their actual usage requirements.

BRIEF DESCRIPTION OF THE DRAWINGS

Other features, details and advantages will become apparent upon reading the detailed description below, and upon analyzing the attached drawings, in which.

DESCRIPTION OF CERTAIN ILLUSTRATIVE EMBODIMENTS

Figure 1:
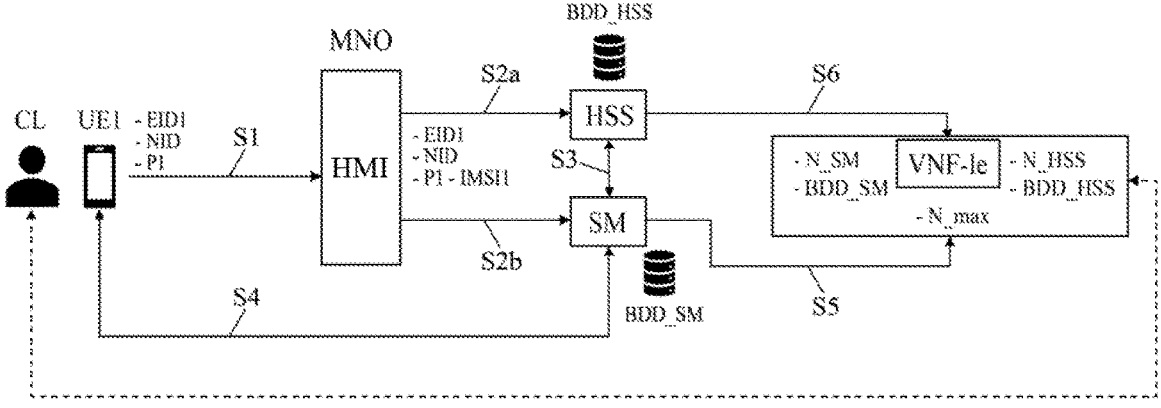
FIG. 1 shows an operation updating a management server to enable network management according to one embodiment.

Reference is now made to FIG. 1. FIG. 1 illustrates an operation implemented within a computerized system of a service provider MNO deploying a communications network available to a customer CL. This operation allows, for example after receiving a request from a current terminal UE1 concerning a modification to the allocation of a current profile P1 subscribed to by customer CL, updating a management server VNF-1e which performs, among other things, access management for the deployed network as well as verification of operational consistency of the deployed network.

In the context of this description, customer CL may be a company, for example an industrial concern, subscribing to a communications offering from a communications service provider MNO in order to use one or more of its services, such a service provider MNO corresponding for example to a mobile network operator (MNO). The subscription then includes the deployment of a communications network supporting the subscribed service(s), for example a non-public network (NPN) deployed by operator MNO to which corporate customer CL can connect its fleet of terminal devices comprising current terminal UE1. A terminal device UE1 may also correspond to a user device such as a smartphone as well as to any type of connected mobile object or module in the context of the Internet of Things (IoT).

Communication for the terminal devices of customer CL is ensured by connection to the network deployed by service provider MNO in accordance with service profiles (or access profiles) subscribed to by customer CL with operator MNO. Subscription to service profiles can be done via a "conventional" offering using physical security processors or via a "virtualized" connectivity offering using electronic security processors or eSIM. The physical security processor of a terminal device, commonly referred to as a SIM card (SIM for "Subscriber Identity Module"), is a physical medium that can be inserted into and removed from a terminal device, allowing a set of data and associated applications to be embedded, this set of data and associated applications constituting a service profile. However, more and more terminals no longer directly incorporate a physical security processor such as a SIM card, but rather a security processor in the form of a software module installed directly in the terminal. This is the electronic SIM card ("embedded SIM" or eSIM). All of the data and associated services constituting a service profile can then be downloaded to the eSIM of each terminal as part of a virtualized connectivity offering involving a fleet of terminals.

In the context of this description, the terminal devices of customer CL each contain a security module and are each compatible with subscribing to a connectivity offering for a fleet of terminals. The security module is typically an "eSIM" type card, also called "eUICC" ("embedded Universal Integrated Circuit Card") or non-removable SIM card. No limitations are tied to this type of card. In one particular embodiment, the security module is a smart card with an operating system offering the functionalities of an eUICC type of card. In another particular embodiment, the security module is integrated into each terminal, thus forming a single entity. More generally, the security module is a dedicated tamper-proof platform comprising hardware and software, capable of securely hosting applications and their confidential and cryptographic data and providing a secure environment for executing applications, these applications and data forming for example a service profile that can be reversibly downloaded to the security module of the terminal.

When subscribing to such a connectivity offering, customer CL subscribes to a certain number of service profiles (including current profile P1) with service provider MNO, the number of profiles subscribed to depending for example on the number of terminals in the fleet of devices of customer CL to be attached to the deployed network. Each subscribed service profile can then be downloaded and active on a single terminal at a time in the fleet of equipment of customer CL.

In the context of this description, management of the subscribed service profiles and of the terminals connected to the deployed network is at least partially controllable by customer CL. In other words, customer CL can request the addition, deletion, or modification of a service profile and can also modify the associations between a service profile and a given terminal, for example by disassociating a service profile active on a given terminal or conversely by associating a service profile that can be activated on a given terminal. These modifications may be managed in particular by service provider MNO in the form of requests sent by customer CL and processed by service provider MNO.

This description is made within the context of the GSMA technical specifications described in particular in sections 3.1.1 and 3.1.4 of the RSP Technical Specification document, Version 2.0 (14 Oct. 2016). In particular, an allocation modification request for allocating a current profile P1 to a terminal UE1 represented by steps S1, S2a and S2b, S3 and S4 of FIG. 1 can be processed according to existing procedures as mentioned in the technical specifications.

Thus, with reference to FIG. 1, in step S1, a current terminal UE1 belonging to the fleet of devices of customer CL makes an allocation modification request for current profile P1 which is one of the service profiles subscribed to by customer CL via the connectivity offering. FIG. 1 takes place in a common situation in which a connectivity offering has already been subscribed to by customer CL and a fixed number of activatable service profiles has been previously allocated to customer CL by provider MNO. The definition of the connectivity offering for customer CL may involve, according to existing methods, the creation of identifiers such as "activation codes" which have corresponding service profiles allocated to customer CL and are subsequently recognizable by provider MNO and for example by access manager SM. These activation codes are then sent to customer CL so that the various terminals in the fleet of equipment of customer CL make activation requests for the allocated service profiles by entering, for example, the activation codes provided.

In the current situation under consideration, a certain number of subscribed service profiles have been activated and associated with terminals connected to the deployed network, for example during previous requests made by customer CL to provider MNO and not represented in FIG. 1. FIG. 1 therefore represents a new allocation modification request for a current profile P1, made by a current terminal UE1 among the fleet of devices of customer CL. Such an allocation modification request may for example consist of requesting a disassociation between current profile P1 and current terminal UE1 in the case where a previously requested association (made during a previous request) exists between current profile P1 and current terminal UE1. The allocation modification request may also consist of adding the new current profile P1 by associating it with current terminal UE1, so as to add a new connection to the network deployed by provider MNO, for example in the case where current profile P1 has been subscribed to and has never yet been downloaded to a terminal in the fleet of equipment of customer CL.

With reference to FIG. 1, the allocation modification request for current profile P1 is carried out in step S1 by current terminal UE1 by communicating with the information system of operator MNO, by example via a human-machine interface HMI of the information system of operator MNO.

The content of such an allocation modification request for current profile P1, sent to provider MNO by current terminal UE1, may comprise:

a network identifier which allows identifying the network concerned by the request, for example an NID ("Network Identifier"), an identifier IMEI1 which allows uniquely identifying current terminal UE1, for example an IMEI ("International Mobile Equipment Identity"), or an identifier EID1 of a security processor integrated into current terminal UE1 of the EID type ("Embedded Identity Document"), an identifier attached to current profile P1 which is the subject of the request from current terminal UE1. This identifier allows uniquely defining the identity of the profile concerned and can correspond for example to the activation code or authentication code communicated by provider MNO to customer CL when subscribing to the offering and uniquely assigned to a subscribed profile (in this case, current profile P1). Such an activation code may for example comprise "Matching ID" type data enabling provider MNO to recognize current profile P1 concerned by the request. In another embodiment, this identifier can correspond to any other value enabling customer CL to designate, uniquely or not, a profile targeted by the request from current terminal UE1 among all the subscribed service profiles, for example the International Mobile Subscriber Identity (IMSI) in the context of second, third, or fourth generation networks (2G, 3G, or 4G), or the Subscription Permanent Identifier (SUPI) in the context of fifth generation (5G) networks.

optionally, an identifier of the subscribed connectivity offering to which current profile P1 is linked, such an identifier of the connectivity offering being communicable by provider MNO to customer CL when subscribing to the offering, optionally, details concerning the object of the request, for example such as "new association", "disassociation", "change of association" etc.

After receiving such an allocation modification request for current profile P1, the information system of provider MNO identifies current profile P1 concerned by the request, for example by the association of the "Matching ID" received by current terminal UE1 during the request, with an identifier IMSI1 known to provider MNO and uniquely associated with current profile P1. The activatable current profile P1 may also be created by provider MNO at the end of step S1, for example in the case where the allocation modification request consists of requesting the activation of current profile P1 on current terminal UE1, and current profile P1 was not created by provider MNO during the subscribing to the offering.

In a step S2a, data concerning current profile P1 is stored in authentication database BDD_HSS of authentication server HSS. Authentication server HSS is a "Home Subscriber Server" type of server and mainly comprises an authentication database BDD_HSS storing information relating to the various subscriptions with provider MNO, the various service profiles subscribed to for a given customer subscription, and in particular their activation status. Authentication server HSS corresponds in particular to the UDR ("User Data Registry") server for 5th generation (5G) mobile networks, formerly called the HLR ("Home Location Register") server. Authentication server HSS in particular allows service provider MNO to register the service profiles of terminals authorized to connect to the network.

Thus, in step S2a, authentication server HSS comprises an update concerning current profile P1 and current terminal UE1 concerned by the allocation modification request for current profile P1. For example, if the allocation modification request for current profile P1 consists of disassociating current profile P1 from current terminal UE1, authentication database BDD_HSS takes into account in particular, at the end of step S2a:

a deletion of an existing correspondence between the network having identifier NID, current terminal UE1 having identifier EID1, and current profile P1 having identifier IMSI1, and a decrementing of the total number N_HSS of service profiles registered on the network by authentication server HSS, current profile P1 no longer being registered and active on the network.

Provider MNO then registers, via database BDD_HSS of authentication server HSS, that current profile P1 can again be activated by a communication terminal of customer CL and that current terminal UE1 is once again capable of hosting a new service profile for connecting to the network.

If the allocation modification request for current profile P1, received by provider MNO in step S1, consists of associating current profile P1 with current terminal UE1, authentication database BDD_HSS takes into account in particular, at the end of step S2a:

an addition of a newly created correspondence in step S2a between the network having identifier NID, current terminal UE1 having identifier EID1, and current profile P1 having identifier IMSI1, and an incrementing of the total number N_HSS of service profiles registered on the network by authentication server HSS.

Provider MNO then registers, via database BDD_HSS of authentication server HSS, that current profile P1 is activated and associated with current terminal UE1.

Authentication server HSS therefore registers the new activation status of current profile P1 as well as other information relating to current profile P1. Thus, in the case of a request to associate a new current profile P1 with current terminal UE1, step S2a ensures that current profile P1 is created by provider MNO in a secure manner and that such a current profile P1 can be activated and used by current terminal UE1.

The updating of authentication database BDD_HSS of authentication server HSS in step S2a can take place in particular after a request validation procedure by provider MNO (not shown in FIG. 1), for example to ensure that current profile P1 is not already activated and associated with another communication terminal or that current terminal UE1 does not already contain another active service profile for example. Various existing methods allow provider MNO to determine whether or not the request from current terminal UE1 is acceptable. Some methods can thus consist, in the case of a request for an association between current terminal UE1 and current profile P1, of automatically disassociating a possible existing association between current terminal UE1 and another service profile in order to replace the latter with current profile P1. In the case of an association modification request for current profile P1 being refused by provider MNO, provider MNO sends a message refusing the request to current terminal UE1, for example via a refusal message sent by access manager SM in step S4. In particular, in the case of a request for association between current profile P1 and current terminal UE1 being refused by provider MNO, authentication database BDD_HSS is not updated in step S2a and no new current profile P1 is created by access manager SM in a step S2b.

In step S2b, provider MNO sends the information relating to the allocation modification request for current profile P1 (in particular comprising the "Matching ID" relating to current profile P1 and identifier EID1 of current terminal UE1), to access manager SM so that access manager SM creates current profile P1 to be downloaded specifically to the eSIM security module having identifier EID1 of current terminal UE1. Access manager SM corresponds in this context to an eSIM module management platform deployed by provider MNO, of the "Subscriber Manager eSIM" type, which corresponds to the SMDP ("Subscription Manager Data Preparation") server in the technical specifications defined by the GSMA ("Global System for Mobile Communications Association") or to the grouping of SMDP server and SM-SR ("Subscription Manager Secure Routing") within the framework of Machine-To-Machine (M2M) for example. Access manager SM then allows registering the service profiles subscribed to by customer CL, in the eSIM cards of the communication terminals of customer CL.

In step S2*b*, in the case of a request to add current profile P1 to current terminal UE1 for example, access manager SM then prepares the download data for current profile UE1 which can be activated by current terminal UE1, by encapsulating this current profile data P1 in a message to be sent to current terminal UE1 in a step S4, for example in the form of a QR code. In a step S3 between steps S2*b* and S4, access manager SM may also verify, in authentication database BDD_HSS of authentication server HSS, that current profile P1 has indeed been registered and can be activated by current terminal UE1. In the case of a request to delete current profile P1 of current terminal UE1 being received in step S1, access manager SM can verify in step S3 that the disassociation of current profile P1 and current terminal UE1 has been registered in authentication database BDD_HSS.

In step S4, access manager SM then sends confirmation of the required association modification to current terminal UE1. In the case of an association request between current terminal UE1 and current profile P1, access manager SM actually encapsulates the data related to current profile P1 having identifier IMSI1 and sends the data (in encrypted form) enabling the installation of current profile P1 and its content in a message addressed to current terminal UE1, in step S4. This message can correspond to a QR code type of digital code or to any other type of message encapsulating the data of current profile P1 and readable by current terminal UE1 via a graphic sensor integrated into current terminal UE1 for example. The message sent by access manager SM to current terminal UE1 in step S4 then contains current profile P1 to be downloaded by current terminal UE1 onto its eSIM security module. In the case of a request to disassociate current terminal UE1 and current profile P1 for example, access manager SM can simply send confirmation that the disassociation has been validated by provider MNO, in particular by checking in step S3 that such a disassociation has been registered by provider MNO in authentication database BDD_HSS.

At the end of step S4 and after waiting for a possible predefined period during which the customer could indicate any problem with processing its request, access manager SM registers, in a database BDD_SM or in a local memory specific to access manager SM, the modification of the association concerning the network having identifier NID, current terminal UE1 having identifier EID1 (corresponding here to the identifier of an eSIM module integral to current terminal UE1), and current profile P1. In another embodiment, access manager SM waits, at the end of step S4, for a return message from current terminal UE1 before updating its database BDD_SM. This return message, not shown in FIG. 1, can be a message confirming the successful reception by current terminal UE1 of the message sent by access manager SM in step S4 or confirming the successful downloading of the installation data of current profile P1 in the case of a profile installation request for example.

Thus, in the case of an association request between current terminal P1 and current profile P1, when access manager SM receives, at the end of step S4, a confirmation from customer CL (for example via terminal UE1) of the successful downloading of the data of current profile P1 to current terminal UE1, access manager SM in turn updates its database BDD_SM by registering that:

the total number N_SM of service profiles activated on an eSIM module of customer terminal CL on the network has increased, with a new profile downloaded (namely current profile P1), a new association between current terminal UE1 and current profile P1 exists for the network considered (corresponding to an association between the identifiers EID1. IMSI1, and NID for example).

Conversely, if the accepted request consists of requesting the disassociation of current terminal UE1 and current profile P1, when at the end of step S4 access manager SM receives a confirmation from customer CL (for example via terminal UE1) that the disassociation has indeed been taken into account (for example the eSIM module of current terminal UE1 is once again free for a new association with a service profile), access manager SM in turn updates its database BDD_SM by registering that:

the total number N_SM of service profiles activated on an eSIM module of customer terminal CL on the network has decreased, with a new service profile detached from the network and once again activatable (namely current profile P1), an existing association between the eSIM module of current terminal UE1 and current profile P1 for the network concerned is deleted (corresponding to a disassociation between identifiers EID1, IMSI1, and NID for example).

The total number N_SM of service profiles activated on an eSIM module and/or the associations registered by access manager SM can potentially differ from the total number N_HSS of service profiles registered by authentication server HSS and/or or the associations registered by authentication server HSS in the case of possible problems with processing the request as reported by customer CL at the end of step S4: the return message received by access manager SM indicating for example that current profile P1 could not be downloaded to the eSIM module of current terminal UE1 (the QR code not being readable by current terminal UE1 for example). In this case, the total number N_SM of service profiles activated on an eSIM module registered by access manager SM will not be incremented and will therefore be less than the total number N_HSS of service profiles registered by authentication server HSS. The association between identifiers NID, EID1, and IMSI1, corresponding to an association between current terminal UE1 and current profile P1, will exist in authentication database BDD_HSS of authentication server HSS but will be absent in database BDD_SM of access manager SM.

During steps S5 and S6, access manager SM and authentication server HSS centralize information, which among other things includes the information contained in their respective databases BDD_SM and BDD_HSS as updated at the end of the processed request. This centralization of information is carried out within a management server VNF-1e.

Management server VNF-1e is a registry specific to the deployed network and in particular contains information relating to the usage rights associated with the respective operating licenses of the software functions used in the network architecture, such as authentication server HSS for example. Thus, management server VNF-1e contains for example information relating to a maximum number N_max of service profiles that can be activated simultaneously by authentication server HSS on the deployed network, in accordance with the conditions of use of authentication server HSS as subscribed to by authentication server HSS. The kernel of the network deployed by provider MNO generally contains various software functions each having a potential operating license and concerning, among other things, a maximum number of simultaneous users on the network; management server VNF-1e may comprise several maximum numbers of simultaneous users on the network, each maximum number being specific to each software function on the network.

In step S5, access manager SM thus sends a first message to management server VNF-1e, this first message in particular containing information contained in database BDD_SM or in the memory of access manager SM as updated by the latter after step S4 (for example, after reception of a message confirming the correct processing of the request by current terminal UE1). This updated information concerns, for example:

the total number N_SM of service profiles activated on the network as updated in database BDD_SM of access manager SM, and/or the associations between service profiles and terminals activated on the network as updated in database BDD_SM of access manager SM.

Such a first message sent by access manager SM to management server VNF-1e in step S5 allows management server VNF-1e to include up-to-date information related to the service profiles as actually activated and associated with the respective eSIM modules of the communication terminals of customers CL.

In step S6, authentication server HSS sends a second message to management server VNF-1e, this second message in particular containing information contained in database BDD_HSS of authentication server HSS as updated by the latter at the end of step S2a. This updated information concerns, for example:

the total number N_HSS of service profiles registered on the network as updated in database BDD_HSS of authentication server HSS, and/or the associations between service profiles and active terminals on the network as updated in database BDD_HSS of authentication server HSS.

Such a second message sent by authentication server HSS to management server VNF-1e in step S6 allows management server VNF-1e to include up-to-date information related to the service profiles and to their association with given terminals as actually validated by authentication server HSS. In another embodiment, the second message can be sent by authentication server HSS to management server VNF-1e as soon as authentication database BDD_HSS of authentication server HSS is updated at the end of step S2a.

Furthermore, management server VNF-1e also comprises its own database BDD_LE containing information relating to the usage rights of each software function used in the deployed network and associated with an operating license. Such a database BDD_LE can comprise in particular the maximum number of simultaneous users on the network as defined by each of the software functions of the network, for example such as the maximum number N_max of service profiles simultaneously activated on the network by authentication server HSS.

Figure 3:
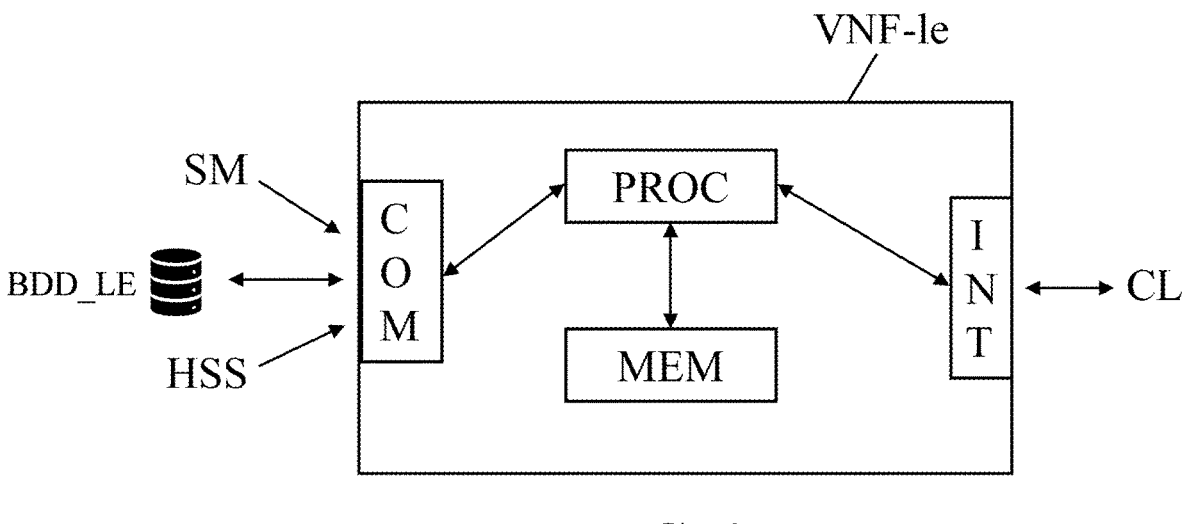
FIG. 3 schematically illustrates a hardware structure of a management server according to one embodiment.

Referring to FIG. 3, an example hardware structure of management server VNF-1e is illustrated. Management server VNF-1e may comprise:

a communication interface COM for communicating with access manager SM and authentication server HSS in order to receive the first and second update messages from access manager SM and authentication server HSS respectively. Communication interface COM of management server VNF-1e is also connected to a database BDD_LE containing information relating to the usage rights of each software function used in the deployed network and associated with an operating license, this information comprising for example the maximum number N_max of service profiles that can be activated simultaneously on the network by authentication server HSS or other maximum numbers of simultaneous users on the network defined by other vendors of software functions included in the network. Alternatively, such a database BDD_LE can be directly integrated into management server VNF-1e;

a memory unit MEM which in particular stores instructions of a computer program for executing a method of managing network access as detailed below in the description of FIG. 2. Memory unit MEM also stores messages received from access manager SM and from authentication server HSS.

a processing circuit comprising a processor PROC and cooperating with communication interface COM for the execution of the method of managing network access as detailed below in the description of FIG. 2; and a customer interface INT enabling management server VNF-1e to display information resulting in particular from execution of the method of controlling network access by the processing circuit, so that this information is readable by customer CL (by means of one or more terminals in the customer's fleet of equipment, for example).

Figure 2:
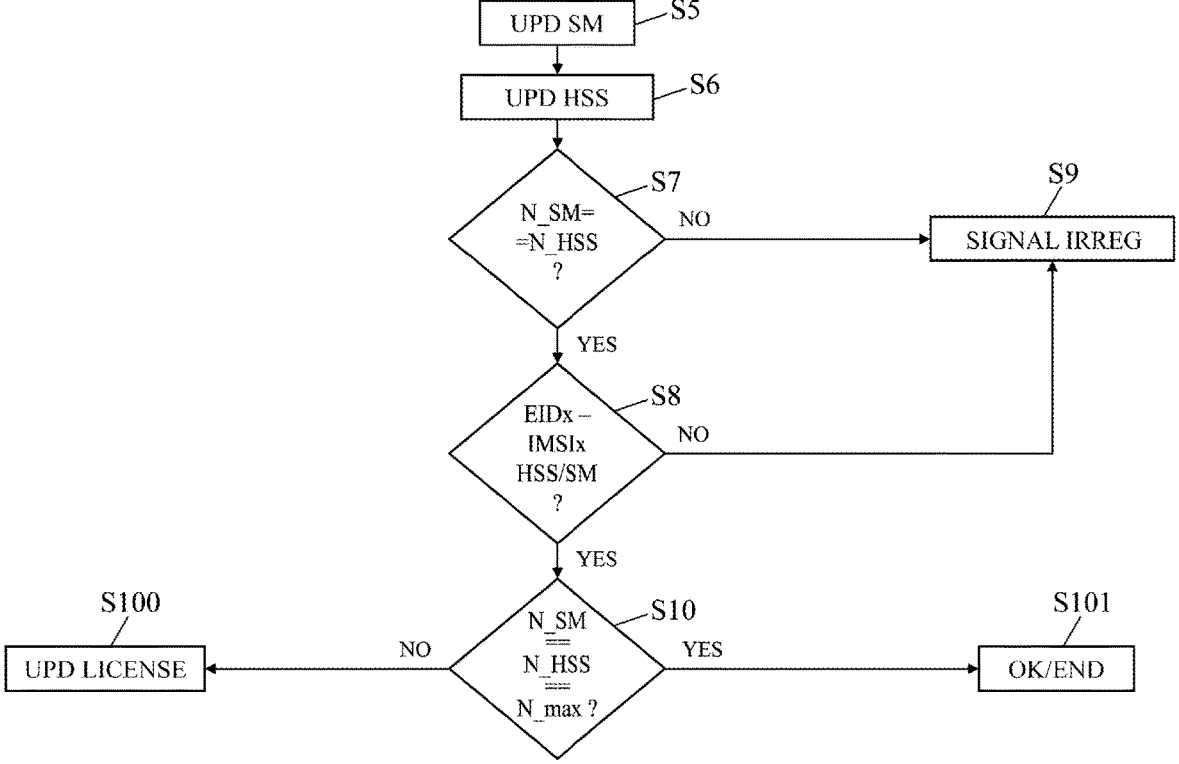
FIG. 2 shows a succession of steps implemented by a management server to enable managing access and use of the network according to one embodiment.

Reference is now made to FIG. 2. FIG. 2 illustrates a method implemented by a management server VNF-1e of service provider MNO so as to manage the access and use of network services by customer CL. In step S5, management server VNF-1e receives a first update message from access manager SM. This first message, stored in memory unit MEM of management server VNF-1e, contains in particular:

the total number N_SM of active service profiles on the network, counted by access manager SM following the latest update to database BDD_SM of access manager SM, and/or the service profiles activated and associated with communication terminals connected to the network as registered by access manager SM following the latest update to database BDD_SM of access manager SM.

Such a first update message received by management server VNF-1e, originating from access manager SM in step S5, takes place in particular when, at the end of processing a customer request from a current terminal UE1 as illustrated in FIG. 1, access manager SM registers:

the activation of a new current profile P1 that is subscribed to, by associating it with current terminal UE1, which increases the total number N_SM (becoming N_SM+1) of active service profiles on the network counted by access manager SM and creates a new association (NID-EID1-IMSI1) in database BDD_SM of access manager SM, or the disassociation of a current profile P1 and current terminal UE1, which reduces the total number N_SM (becoming N_SM−1) of active service profiles on the network counted by access manager SM and deletes an existing association (NID-EID1-IMSI1) in database BDD_SM of access manager SM.

In principle, such an update of management server VNF-1e by access manager SM does not take place (or at least does not modify the existing data) when access manager SM sends a decision to reject the request in step S4 of FIG. 1 and database BDD_SM of access manager SM is not modified for example. In another embodiment, the first message received from access manager SM is identical to a message previously received from access manager SM. In particular, management server VNF-1e may receive the first message even in the absence of a new allocation modification request for a current profile P1 being accepted by provider MNO and therefore a request to update the data of access manager SM. Management server VNF-1e may receive the first message as part of a periodic update of management server VNF-1e and/or as part of an audit for example.

In step S6, management server VNF-1e receives a second update message from authentication server HSS. This second message, stored in memory unit MEM of management server VNF-1e, contains at least:

the total number N_HSS of active service profiles on the network as registered by authentication server HSS following the latest update to database BDD_HSS of authentication server HSS, and the service profiles activated and associated with communication terminals connected to the network as registered by authentication server HSS following the latest update to database BDD_HSS of authentication server HSS.

Such a second update message received by management server VNF-1e from authentication server HSS in step S6 takes place in particular when, after processing a customer request from a current terminal UE1 as illustrated in FIG. 1, authentication server HSS approves the request from terminal UE1 and registers:

the activation of a new subscribed current profile P1 by associating it with current terminal UE1, which increases the total number N_HSS (becoming N_HSS+1) of active service profiles on the network counted by authentication server HSS and creates a new association (NID-EID1-IMSI1) in database BDD_HSS of authentication server HSS, or the disassociation of current profile P1 and current terminal UE1, which reduces the total number N_HSS (becoming N_HSS-1) of active service profiles on the network counted by authentication server HSS and deletes an existing association (NID-EID1-IMSI1) in database BDD_HSS of authentication server HSS.

In principle, such an update of management server VNF-1e by authentication server HSS does not take place (or at least does not modify the existing data) when authentication server HSS rejects the request from current terminal UE1 between steps S2 and S3 of FIG. 1 and database BDD_HSS of authentication server HSS is not modified for example. In another embodiment, the second message received from authentication server HSS is identical to a message previously received from authentication server HSS. In particular, management server VNF-1e may receive the second message even in the absence of a new allocation modification request for current profile P1 being accepted by provider MNO and therefore the data of authentication server HSS being updated. Management server VNF-1e may receive the second message as part of a periodic update of management server VNF-1e and/or as part of an audit for example.

Once the first and second update messages are received in steps S5 and S6, management server VNF-1e proceeds with managing the network access and usage via a first comparison in step S7. This first comparison consists of comparing the total number N_SM of active service profiles on the network counted by access manager SM, with the total number N_HSS of active service profiles on the network as activated by authentication server HSS, and verifying that these two values N_SM, N_HSS separately updated by access manager SM and authentication server HSS are equal. Indeed, the equality of values N_SM and N_HSS makes it possible first of all to guarantee that the total number of profiles N_HSS activated by authentication server HSS and therefore known to provider MNO is the same as the total number of profiles N_SM actually activated on eSIM modules of the terminals and used on the network and known to customer CL. If these two values N_SM and N_HSS are different, management server VNF-1e reports the presence of an irregularity in the use of the network in a step S9. The values N_SM and N_HSS may differ in the case of possible problems in processing the request, reported by customer CL via a return message received by access manager SM indicating for example that current profile P1 which was the subject of the last request processed by provider MNO could not be downloaded to the eSIM module of current terminal UE1 (the QR code not being readable by current terminal UE1 for example) despite the activation of current profile P1 by authentication server HSS. In this case, the total number N_SM of service profiles activated on an eSIM module as registered by access manager SM will not be incremented and will therefore be less than the total number N_HSS of service profiles activated by authentication server HSS. The association between identifiers NID, EID1, and IMSI1 corresponding to an association between current terminal UE1 and current profile P1 will exist in authentication database BDD_HSS of authentication server HSS but will be absent from database BDD_SM of access manager SM. Thus, the N_SM and N_HSS values as updated in management server VNF-1e by access manager SM and authentication server HSS in steps S5 and S6 will differ.

In one embodiment of the development, this irregularity in the use of the network is displayed in customer interface INT so as to be readable by customer CL via a reading of management server VNF-1e. In one embodiment of the development (not described by FIGS. 2 and 3), management server VNF-1e can communicate with a management entity of service provider MNO in order to report an irregularity in the use of the deployed network so as to block any new addition request as long as the usage irregularity is not resolved (for example by a new updating of management server VNF-1e in steps S5 and S6, such an update providing equal values N_HSS and N_SM).

If the values N_SM and N_HSS are indeed equal, management server VNF-1e continues managing the network access and use via a second comparison in step S8. This second comparison consists of verifying that the associations between service profiles and communication terminals activated on the network as registered by access manager SM on the one hand and by authentication server HSS on the other are indeed the same. In other words, this second comparison allows verifying that:

the active service profiles on the network as registered by access manager SM and authentication server HSS are indeed the same, and the terminals connected to the network as registered by access manager SM and authentication server HSS are indeed the same, and for each active service profile on the network, access manager SM and authentication server HSS do indeed associate the same communication terminal with it.

In effect, while step S7 makes it possible, for example, to guarantee the absence of "ghost" profiles corresponding to profiles activated by provider MNO (via authentication server HSS) but not actually used by customer CL, step S8 makes it possible to ensure that there is no association error between the terminals of customer's CL fleet of equipment connected to the network and the various profiles activated and used by customer CL, such errors being for example related to issues in the correspondence between the profile management systems on the service provider MNO side (therefore on the authentication server HSS side) and on the customer CL side (therefore on the access manager SM side). If, in step S8, an association error is detected (for example, a given service profile having identifier IMSIk is registered by access manager SM and authentication server HSS as being associated with two different terminals having identifiers EIDa and EIDb for example), management server VNF-1e proceeds to step S9 and indicates an irregularity in the use of the network. In one embodiment, steps S7 and S8 can correspond to a single step in the case where, for example, management server VNF-1e detects a difference between values N_SM and N_HSS by comparing the associations between service profiles and communication terminals activated on the network.

If, in step S8, no association error is detected, management server VNF-1e continues the procedure for managing network access and use by customer CL by carrying out a third comparison in a step S10. For this third comparison, management server VNF-1e reads information, from database BDD_LE of management server VNF-1e, relating to the usage rights for the software functions used in the network and in particular identifies the maximum number N_max of service profiles that can be activated simultaneously by authentication server HSS on the network. The third comparison of the method then consists of comparing the total number N_SM (or N_HSS) of active service profiles on the network as counted by access manager SM and authentication server HSS (step S7 ensuring that this number is the same for both entities SM and HSS), with the maximum number N_max of profiles that can be activated simultaneously on the network, as stipulated in the terms of the operating licenses associated with the subscription of customer CL and contained in database BDD_LE of management server VNF-1e. Step S10 may also comprise comparisons between the total number N_SM (or N_HSS) of active service profiles on the network as counted by access manager SM and authentication server HSS, and each of the maximum numbers of users simultaneously authorized on the network, as defined by the operating licenses for other software functions of the network, these maximum numbers being read by management server VNF-1e in database BDD_LE.

Step S10 thus makes it possible to verify that the licenses subscribed to by service provider MNO from one or more vendors of software functions used in the network by customer CL present the hardware and software capabilities as actually required and used by customer CL. If, in step S10, the total number N_SM (or N_HSS) of service profiles active on the network as counted by access manager SM and authentication server HSS is equal to the maximum number N_max of profiles that can be activated simultaneously on the network, this means that the network as deployed by service provider MNO is being used to capacity by customer CL and that the operating conditions of the licenses as subscribed to by provider MNO (and, implicitly, customer CL) from the vendors of software functions (in this case the vendor of the software function of authentication server HSS) are properly estimated. In this case, management server VNF-1e optionally confirms that the licenses as subscribed to by customer CL are properly adapted to its use of the network, by displaying a confirmation message such as "license OK" for example on customer interface INT in a step S101. The procedure for managing access and use of management server VNF-1e therefore ends at step S101 without changing the subscription conditions of customer CL with provider MNO.

If, in step S10, the total number N_SM (or N_HSS) of active service profiles on the network as counted by access manager SM and authentication server HSS is greater than the maximum number N_max of profiles that can be activated simultaneously on the network (or than one of the maximum numbers defined by the operating license for one of the network's software functions), this means that the utilization conditions for the network's software functions as established by the vendors of the software functions for service provider MNO are not being met and customer CL is overutilizing the network deployed by service provider MNO. This is the case for example when customer CL subscribes to a connectivity offering for N terminals (therefore resulting in N operating licenses associated with the subscription), but during actual utilization of the network, the fleet of equipment of customer CL attached to the network has more than N communication terminals and/or requires the activation of more than N service profiles. If, in step S10, the total number N_SM (or N_HSS) of service profiles active on the network as counted by access manager SM and authentication server HSS is less than the maximum number N_max of profiles that can be activated simultaneously on the network, this indicates that customer CSS is underutilizing the network deployed by service provider MNO. Possibly, customer CL may have subscribed to a connectivity offering for N terminals (therefore resulting in N operating licenses associated with the subscription) but without using the N communication terminals simultaneously and/or without having required simultaneous activation of the N service profiles it has ordered.

In a scenario of overutilization and possibly underutilization of the network, a readjustment of the network operating licenses can allow resizing the network capacities to be in line with the utilization requirements of customer CL (either for legal reasons requiring compliance with network operating conditions in the case of overutilization of the network, or for example for reasons of additional cost in the case of underutilization of the network). Such a readjustment of the operating licenses can be carried out by the vendors of the software functions concerned by the readjustment, for example via a software update. Management server VNF-1e then proceeds with a step S100 aimed at such a readjustment of the network operating licenses, for example by executing a smart contract between service provider MNO and the software function vendors concerned, where the execution condition corresponds to an inequality between the total number N_SM (or N_HSS) of active service profiles on the network as counted by access manager SM and authentication server HSS and the maximum number N_max of profiles that can be activated simultaneously on the network, and the result of this execution leads to a software update on the network. In one embodiment, the update may concern all of the software functions of the network, in particular modifying the operating license information. Management server VNF-1e then displays via customer interface CL a "license UPDATED)" type of message for example. In another embodiment, the operating license is not necessarily updated by management server VNF-1e of service provider MNO, and management server VNF-1e simply displays a "license NOK" type of message via customer interface INT, to inform the customer of the relevance of modifying the subscribed licenses.

Management server VNF-1e then allows managing network access and use by the fleet of terminal devices of a customer CL and deployed by a service provider MNO. It allows both the customer and service provider MNO to ensure proper management of operations within the deployed communications network while complying with the conditions of use of the software functions associated with this network

The invention claimed is:

1. A method implemented by a management server of a provider of a plurality of services, for managing service profiles relating to a service among the plurality, the profiles being allocatable to communication terminals accessing a communications network supporting the service, the method comprising:
   a) receiving a first message to update the management server, originating from an access manager, the first message comprising at least one update of a first total number of service profiles active on the communications network,
   b) receiving a second message to update the management server, originating from an authentication server, the second message comprising at least one update of a second total number of service profiles active on the communications network, and
   c) managing access to the service via at least one comparison between the first total number of service profiles active on the communications network and the second total number of service profiles active on the communications network.

2. The method according to claim 1, wherein the management server further comprises at least one value relating to a maximum number of service profiles that are activable simultaneously on the communications network.

3. The method according to claim 1, wherein the management server is readable by at least one customer of the service provider, via a human-machine interface.

4. The method according to claim 2, wherein the maximum number of service profiles activable simultaneously on the communications network is predefined by at least one operating license of the communications network.

5. The method according to claim 1, wherein receiving a) and b) and managing c) are implemented after acceptance of a request from a current terminal to modify the allocation of a current profile among the subscribed service profiles.

6. The method according to claim 1, wherein the first message further comprises at least one updating of an association between:
   an identifier of a current profile among the allocatable service profiles, an identifier of a current terminal among the communication terminals accessing the network, and
   an identifier of the communications network.

7. The method according to claim 1, wherein the second message further comprises an updating of an association between:
   an identifier of a current profile among the allocatable service profiles,
   an identifier of a current terminal among the communication terminals accessing the network, and
   an identifier of the communications network.

8. The method according to claim 1, wherein, at the end of step managing c), the management server comprises data indicating an anomaly if the first total number of service profiles active on the communications network and the second total number of service profiles active on the communications network are not equal.

9. The method according to of claim 2, wherein the management server is readable by at least one customer of the service provider, via a human-machine interface, and wherein access management for the service further comprises a comparison of at least one of the first total number and the second number total of service profiles active on the communications network, to at least the maximum number of service profiles are activable simultaneously on the communications network.

10. The method according to claim 9, wherein the maximum number of service profiles activable simultaneously on the communications network is predefined by at least one operating license of the communications network, and wherein the operating license is updated if, following the comparison of at least one of the first total number and/or the second total number of service profiles active on the communications network, to the maximum number of service profiles that are activable simultaneously on the communications network, at least one of the first total number and/or the second total number of service profiles active on the communications network does not correspond to the maximum number of service profiles that are activable simultaneously on the communications network, the updating of the operating license consisting of modifying the maximum number of service profiles that are activable simultaneously on the communications network.

11. A management server of a provider of a plurality of services, the management server comprising at least:
   a memory unit, and
   a processor,
   the management server being adapted to implement the method according to claim 1.

12. A non-transitory computer-readable storage medium, storing program code instructions of a computer program, the program code instructions causing the implementation of the method according to claim 1 when the program code instructions are executed by a processor.

* * * * *